US011129022B2

(12) United States Patent
Dhammawat et al.

(10) Patent No.: US 11,129,022 B2
(45) Date of Patent: Sep. 21, 2021

(54) WIRELESS LAN DEPLOYMENT BASED ON MAPPED PASSWORD SAE AUTHENTICATION

(71) Applicant: Cisco Technology, Inc., San Jose, CA (US)

(72) Inventors: Abhishek Dhammawat, San Jose, CA (US); Sudhir Kumar Jain, Fremont, CA (US); Mansi Jain, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 156 days.

(21) Appl. No.: 16/194,550

(22) Filed: Nov. 19, 2018

(65) Prior Publication Data
US 2020/0162915 A1 May 21, 2020

(51) Int. Cl.
*H04L 29/06* (2006.01)
*H04W 12/06* (2021.01)
(Continued)

(52) U.S. Cl.
CPC ......... *H04W 12/068* (2021.01); *H04L 9/0863* (2013.01); *H04L 9/3226* (2013.01);
(Continued)

(58) Field of Classification Search
CPC ... H04L 63/08; H04L 63/083; H04L 63/0823; H04L 63/0853; H04L 63/0876;
(Continued)

(56) References Cited

U.S. PATENT DOCUMENTS

| | | |
|---|---|---|
| 8,126,145 B1 | 2/2012 | Tewari et al. |
| 8,800,022 B2 | 8/2014 | Chen et al. |

(Continued)

FOREIGN PATENT DOCUMENTS

| | | |
|---|---|---|
| CN | 106376057 A | 2/2017 |
| CN | 107948974 A | 4/2018 |

OTHER PUBLICATIONS

RSA Security Inc., RSA Security Ireland Limited, "Securing WLANs with Two-factor Authentication", Jun. 2007, 8 pages.
(Continued)

*Primary Examiner* — Kristine L Kincaid
*Assistant Examiner* — Shaqueal D Wade
(74) *Attorney, Agent, or Firm* — Edell, Shapiro & Finnan, LLC

(57) ABSTRACT

A wireless network environment includes a plurality of access points, a wireless local area network (WLAN) controller, and a plurality of client devices. The client devices attempt to authenticate with the WLAN controller to gain access to wireless services provided by the WLAN controller and/or the access points. To authenticate with the WLAN controller, the WLAN controller obtains a request to establish a wireless network connection from one or more of the client devices. The WLAN controller then provides a response to the request. The response indicates whether the WLAN controller supports performing password-mapped simultaneous authentication of equals (SAE). The WLAN controller then obtains a message including a password-mapped identifier from the client device. The WLAN controller then establishes a connection with the client device based on the password obtained with password-mapped identifier mapping at WLC.

20 Claims, 6 Drawing Sheets

(51) Int. Cl.
  *H04W 12/04* (2021.01)
  *H04L 9/08* (2006.01)
  *H04L 9/32* (2006.01)

(52) U.S. Cl.
  CPC ............ *H04L 63/061* (2013.01); *H04L 63/08* (2013.01); *H04L 63/0876* (2013.01); *H04W 12/04* (2013.01); *H04W 12/06* (2013.01); *H04L 63/205* (2013.01)

(58) Field of Classification Search
  CPC ... H04L 63/205; H04L 63/126; H04L 9/3226; H04L 9/0863; H04L 9/0643; H04L 9/0618; H04L 9/24; H04W 12/0608; H04W 12/06; H04W 12/04; H04W 12/201
  See application file for complete search history.

(56) References Cited

U.S. PATENT DOCUMENTS

| | | | |
|---|---|---|---|
| 2014/0073289 A1* | 3/2014 | Velasco | H04W 4/02 455/411 |
| 2014/0105098 A1* | 4/2014 | Chu | H04B 7/15528 370/315 |
| 2014/0355519 A1 | 12/2014 | Li et al. | |
| 2016/0094535 A1* | 3/2016 | Gast | H04L 63/083 |
| 2016/0135045 A1* | 5/2016 | Lee | H04L 9/0833 726/9 |
| 2017/0006039 A1* | 1/2017 | Ernohzay | H04L 63/102 |
| 2018/0092147 A1* | 3/2018 | Pelletier | H04W 76/025 |
| 2019/0104411 A1* | 4/2019 | Hotchkiss | H04W 12/08 |
| 2019/0347346 A1* | 11/2019 | Tiwary | G06F 16/27 |

OTHER PUBLICATIONS

Wi-Fi Alliance, "Discover Wi-Fi Security", https://www.wi-fi.org/discover-wi-fi/security, downloaded Nov. 19, 2018, 5 pages.
Dan Harkins et al., "Simultaneous Authentication of Equals: A Secure, Password-Based Key Exchange for Mesh Networks", The Second International Conference on Sensor Technologies and Applications, Sep. 9, 2008, 6 pages.
Kanishka, R. Suresh et al., "Wi-Fi Password Two Factor Authentication for Home users (W2FA)", International Journal of Scientific and Research Publications, vol. 6, Issue 10, Oct. 2016, 9 pages.
Hashcat, "New attack on WPA/WPA2 using PMKID", https://hashcat.net/forum/thread-7717.html, Aug. 4, 2018, 7 pages.
IEEE, "802.11-2016—IEEE Standard for Information technology—Telecommunications and information exchange between systems Local and metropolitan area networks—Specific requirements—Part 11: Wireless LAN Medium Access Control (MAC) and Physical Layer (PHY) Specifications", https://standards.ieee.org/standard/802_11-2016.html, Dec. 14, 2016, 24 pages.

* cited by examiner

300

| | PASSWORD MAPPING | PASSWORD | |
|---|---|---|---|
| 304(1) | 1 | PASSWORDA | 302(1) |
| 304(2) | 2 | PASSWORDB | 302(2) |
| 304(3) | 3 | PASSWORDC | 302(3) |
| 304(4) | 4 | PASSWORDD | 302(4) |
| 304(5) | 5 | PASSWORDE | 302(5) |
| 304(6) | 6 | PASSWORDF | 302(6) |
| 304(7) | 7 | PASSWORDG | 302(7) |
| 304(8) | 8 | PASSWORDH | 302(8) |
| 304(9) | 9 | PASSWORDI | 302(9) |
| 304(10) | 10 | PASSWORDJ | 302(10) |

FIG.3

WIRELESS LAN DEPLOYMENT BASED ON MAPPED PASSWORD SAE AUTHENTICATION

TECHNICAL FIELD

The present disclosure relates to wireless network security.

BACKGROUND

Wireless network access may be provided by an enterprise. For example, in an apartment complex, the apartment complex may provide wireless network access to its tenants in the apartment complex's common areas. The wireless network may employ security mechanisms to protect the wireless network and/or its tenants from attacks. For example, the security mechanisms may include Wi-Fi® Protected Access (WPA), Wi-Fi Protected Access 2 (WPA2), and/or Wi-Fi Protected Access 3 (WPA3). WPA3 may use simultaneous authentication of equals (SAE). While WPA3 protects against security vulnerabilities present in WPA and WPA2, it is still vulnerable to a single, one-time password guess attack.

For example, to illustrate this vulnerability of WPA3, in a multi-tenant apartment complex, the apartment complex may provide Wi-Fi service. Each tenant may connect to a single service set identifier (SSID). If a single common password is provided to each tenant, when a tenant moves out of the apartment complex, the moved-out tenant may still access the Wi-Fi service. Therefore, the moved-out tenant may pose a security threat to the Wi-Fi service.

BRIEF DESCRIPTION OF THE DRAWINGS

FIG. 3 illustrates a table depicting a mapping of password-mapped identifiers and passwords, according to an example embodiment.

DESCRIPTION OF EXAMPLE EMBODIMENTS

Overview

Briefly, a method, apparatus, and non-transitory computer readable storage media directed towards network security are disclosed. A wireless network environment may include a plurality of access points, a wireless local area network (WLAN) controller, and a plurality of client devices. The client devices attempt to authenticate with the WLAN controller to gain access to wireless services provided by the WLAN controller and/or the access points. To authenticate with the WLAN controller, the WLAN controller may obtain a request to establish a wireless network connection from one or more of the client devices. The WLAN controller may then provide a response to the request. The response may indicate whether the WLAN controller supports performing password-mapped simultaneous authentication of equals (SAE). The WLAN controller may then obtain a message including a password-mapped identifier from the client device. The WLAN controller then establishes a connection with the client device based on the obtained password-mapped identifier.

EXAMPLE EMBODIMENTS

Figure 1:
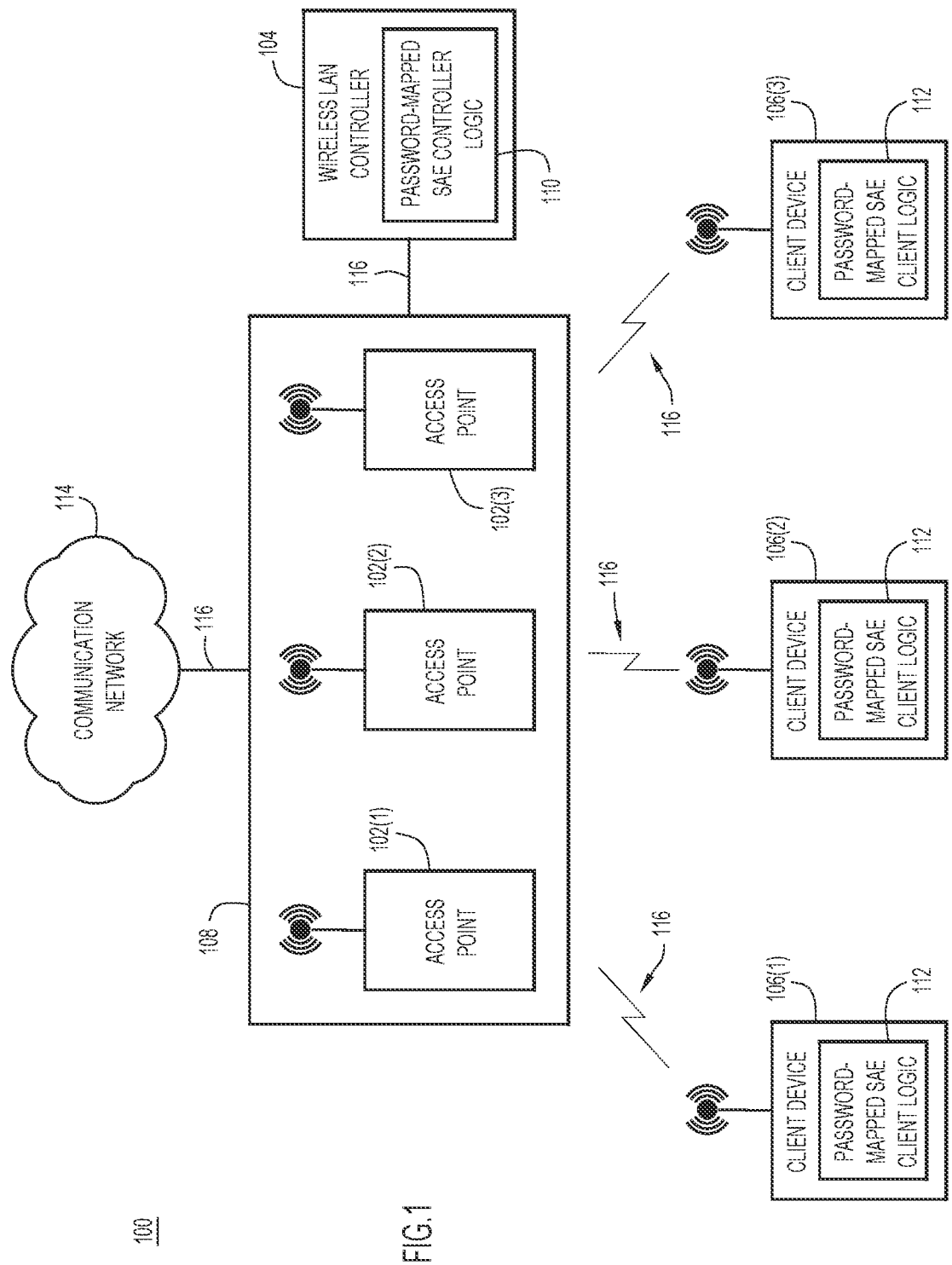
FIG. 1 is a block diagram of a wireless network environment employing network security techniques, according to an example embodiment.

With reference made to FIG. 1, shown is a wireless network environment 100 employing wireless network security techniques, according to an example embodiment. The wireless network 100 may include a plurality of access points 102(1)-102(3), a wireless local access network (WLAN) controller 104, and a plurality of client devices 106(1)-106(3). The plurality of access points 102(1)-102(3) may be located within a geographical area 108, such as an apartment complex. For example, access point 102(1) may be located within a front office of the apartment complex, access point 102(2) may be located within a pool area of the apartment complex, and access point 102(3) may be located within a clubroom of the apartment complex. Each of the plurality of access points 102(1)-102(3) may provide wireless network access to client devices located within each respective geographical area. The plurality of client devices 106(1)-106(3) may be devices, such as laptops, smartphones, and/or tablets, used by tenants. The plurality of client devices 106(1)-106(3) may authenticate with one of the plurality of access points 102(1)-102(3). It should be appreciated that any number of access points, WLAN controllers, and client devices may be included in the wireless network environment 100.

The WLAN controller 104 may configure or control operations of the plurality of access points 102(1)-102(3). Moreover, the WLAN controller 104 may include password-mapped simultaneous authentication of equals (SAE) controller logic 110, as described in more detail herein. While the password-mapped SAE controller logic 110 is shown as being executed by the WLAN controller 104, the password-mapped SAE controller logic 110 may also reside on one or more of the access points 102(1)-102(3). For exemplary purposes only, however, the password-mapped SAE controller logic 110 is described as being resident on the WLAN controller 104. Each of the client devices 106(1)-106(3) may include password-mapped SAE client logic 112, also as described in more detail herein.

Each of the access points 102(1)-102(3) may provide access to a communication network 114, such as the Internet. The access points 102(1)-102(3), the WLAN controller 104, the client devices 106(1)-106(3), and the communication network 114 may communicate with each other over communication links 116. The communication links 116 may be wired, wireless or a combination of wired and wireless. For example, the client devices 106(1)-106(3) may communicate wirelessly with one or more of the access points 102(1)-102(3) and/or the WLAN controller 104. The access points 102(1)-102(3) may communicate with the WLAN controller 104 and the communication network 114 via wired connections, for example.

Figure 2:
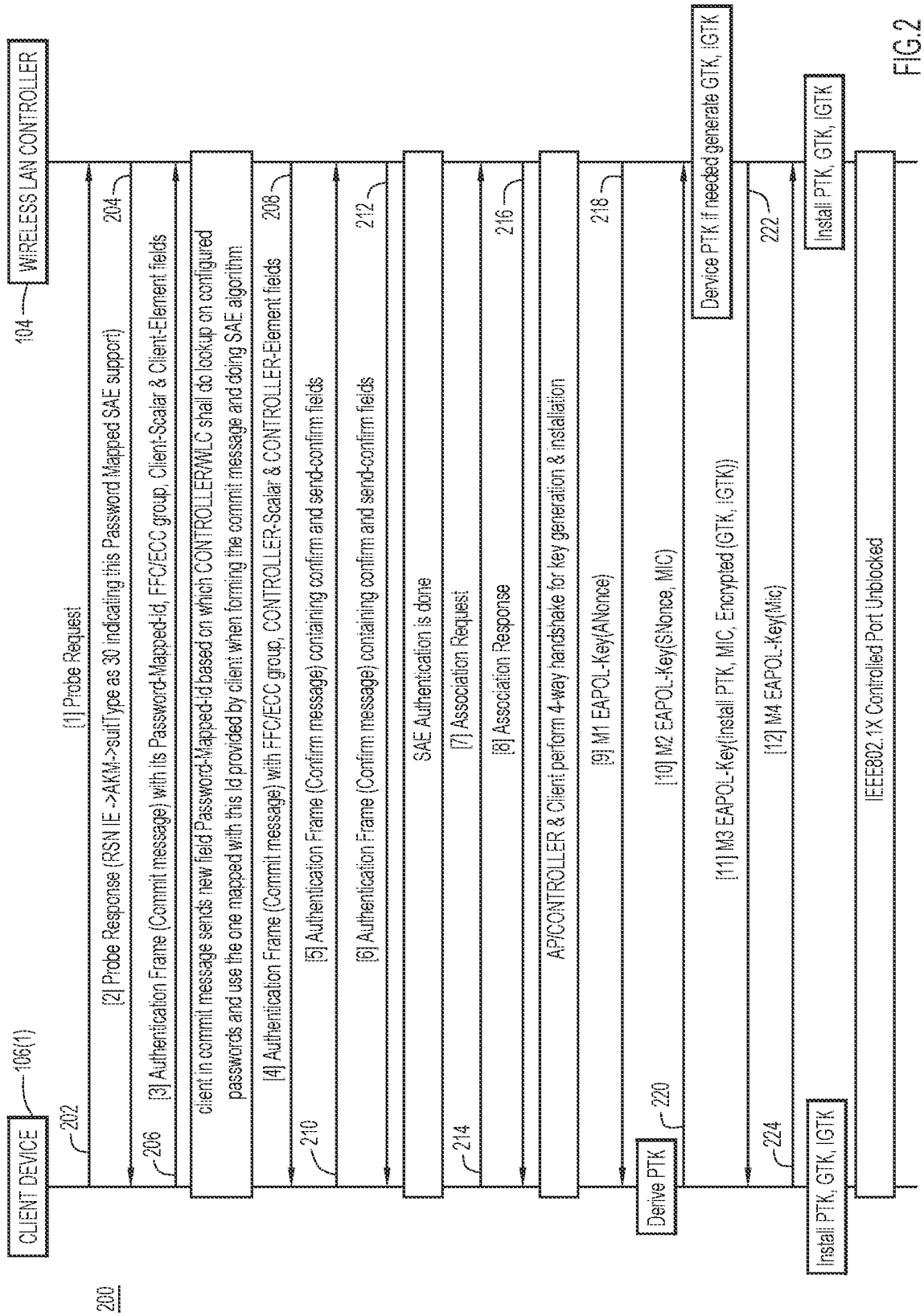
FIG. 2 is a flow diagram depicting network traffic flows to authenticate a client device using password-mapped simultaneous authentication of equals, according to an example embodiment.

Turning to FIG. 2, and with continuing reference to FIG. 1, shown is a flow diagram 200 depicting communications (messages) to authenticate one or more of the plurality of client devices 106(1)-106(3) using password-mapped simultaneous authentication of equals, according to an example embodiment. For example, the communications may be between client device 106(1) and the WLAN controller 104. The password-mapped SAE client logic 112 may perform the communications for the client device 106(1) while the password-mapped SAE controller logic 110 may perform the communications for the WLAN controller 104, for example. For example, at 202, the client device 106(1) may send a probe request to discover wireless networks capable of performing SAE.

The WLAN controller 104 may receive the probe request either directly from the client device 106(1) or via one or more of the plurality of access points 102(1)-102(3). In response to receiving the probe request, the WLAN controller 104 may determine whether it supports SAE. If the WLAN controller 104 supports SAE, then the WLAN controller 104 sends, at 204, a probe response to the client device 106(1). The probe response may include an authentication key management (AKM) having a predetermined suite type value. The suite type value may be used to indicate that the WLAN controller 104 is configured to support SAE. Further, the suite type value may also indicate that the WLAN controller 104 is configured to perform password-mapped SAE. For example, suite type values between 14 and 255, inclusive, may be used. In one embodiment, the suite type may be 30, for example.

In response to receiving the probe response from the WLAN controller 104, the client device 106(1) may determine which types of encryption it is configured to support. For example, the client device 106(1) may determine whether it supports finite field cryptography (FFC) and/or elliptic-curve cryptography (ECC). The client device 106(1) may select the type of encryption based on a priority associated with each type of encryption. For example, the encryption type with the highest priority may be selected. The client device 106(1) may generate a password element, a first random number rand, and a second random number mask. For example, the client device 106(1) may generate the password element, rand, and mask based on a password a user of the client device 106(1) uses to authenticate with the WLAN controller 104. Further, the client device 106(1) may generate two variables, scalar and element, based on the password element, rand, and mask. At 206, the client device 106(1) may send a first authentication frame, or commit message, to the WLAN controller 104. The first authentication frame sent by the client device 106(1) may include the encryption type, the client device scalar, and element values. The first authentication frame sent by the client device 106(1) may also include a password-mapped identifier field. The password associated with a user of the client device 106(1) may have an associated password-mapped identifier. The password-mapped identifier may be used by the WLAN controller 104, as described in more detail herein. The password-mapped identifier may be encoded in the first authentication frame sent by the client device 106(1) in a password-mapped identifier field. The password-mapped identifier field may have a length of two octets and be placed after element value. Because the WLAN controller 104 and the client device 106(1) both support password-mapped SAE, the WLAN controller 104 may properly interpret the password-mapped identifier field. Therefore, the client device 106(1) does not send the password associated with the user of the client device 106(1) during authentication, thereby preventing an attacker from discovering the password by intercepting communications between the client device 106(1) and the WLAN controller 104.

In response to receiving the first authentication frame from the client device 106(1), the WLAN controller 104 may determine whether it supports the encryption type (group) in the authentication frame. Further, the WLAN controller 104 may determine the password for the wireless network the client device 106(1) is attempting to authenticate with based on the password-mapped identifier received from the client device 106(1). The WLAN controller 104 may be configured with a mapping of a plurality of passwords with a plurality of password-mapped identifiers. The mapping may be stored in a database, for example. In one embodiment, the password-mapped identifiers may be numerical. After determining the password associated with the password-mapped identifier to use for the wireless network, the WLAN controller 104 may generate a WLAN controller password element based on the mapped password. The WLAN controller 104 also may generate a WLAN controller rand and mask, both of which may be random numbers. The WLAN controller 104 may then use the password element, rand, and mask to generate the WLAN controller scalar and element variables. Then, at 208, the WLAN controller 104 may send a first authentication frame, or commit message, to the client device 106(1). The WLAN controller first authentication frame may include the encryption type, the WLAN controller scalar, and the WLAN controller element.

In response to receiving the first authentication frame from the WLAN controller 104, the client device 106(1), at 210, may send a second authentication frame, or confirm message, to the WLAN controller 104. The second authentication frame of the client device 106(1) may include a confirm field and a send-confirm field. The value of the confirm field may be based on at least the values of the client device scalar, client device element, client device password element, WLAN controller scalar, WLAN controller element, WLAN controller password element, and the send-confirm field. The value of the confirm field may be used at the WLAN controller 104 to authenticate the client device 106(1), as described herein.

In response to receiving the second authentication frame from the client device 106(1), the WLAN controller 104, at 212, may verify the value of the confirm field by computing its own confirm value. For example, the confirm value computed by the WLAN controller 104 may be based on at least the values of the client device scalar, client device element, client device password element, WLAN controller scalar, WLAN controller element, WLAN controller password element, and the send-confirm field. If the confirm value computed by the WLAN controller 104 matches the confirm value received from the client device 106(1), then the WLAN controller 104 successfully verified the confirm value. When the confirm value is verified, then the WLAN controller 104 may compute a pairwise master key (PMK) identifier. The WLAN controller 104 may then send a second authentication frame, or confirm message, to the client device 106(1). The second authentication frame sent by the WLAN controller 104 may include the confirm and send-confirm fields as computed by the WLAN controller 104.

In response to receiving the second authentication frame from the WLAN controller 104, the client device 106(1), at 214, may send an association request to the WLAN controller 104. The association request may include a request for the client device 106(1) to become associated with the WLAN controller 104.

In response to receiving the association request from the client device 106(1), the WLAN controller 104 may send, at 216, an association response to the client device 106(1). The association response may grant the association request from the client device 106(1) to associate with the WLAN controller 104.

The WLAN controller 104 and the client device 106(1) may then engage in a four-way handshake to generate and install keys. The WLAN controller 104 may initiate the four-way handshake by sending, at 218, an Extensible Authentication Protocol over Local Area Network (EAPOL) key including an access point nonce (ANonce) to the client device 106(1).

After receiving the EAPOL key and the ANonce, the client device 106(1) may derive a pairwise transient key (PTK). The PTK may be derived by concatenating the PMK, the ANonce, a station nonce (SNonce), a MAC address of the WLAN controller 104, and a MAC address of the client device 106(1). After deriving the PTK, the client device 106(1) may then send an EAPOL key including the SNonce and a message integrity code (MIC) at 220.

After receiving the EAPOL key with the SNonce and MIC, the WLAN controller 104 may derive the PTK as well. The WLAN controller 104 may derive the PTK using the same attributes as the client device 106(1), as described above. The WLAN controller 104 may also generate a group temporal key (GTK) and an integrity group temporal key (IGTK). The GTK may be used to decrypt multicast and broadcast network traffic. At 222, the WLAN controller 104 may send an EAPOL key including a command to install the PTK, a MIC, and encrypted versions of the GTK and IGTK to the client device 106(1).

After receiving the command to install the PTK, the MIC, and encrypted versions of the GTK and IGTK, the client device 106(1) may send the final handshake message. The final handshake message may include an EAPOL key with a MIC. The client device 106(1) may also install the PTK, GTK, and IGTK.

After receiving the fourth handshake, the WLAN controller 104 also may install the PTK, GTK, and IGTK.

In this manner, the WLAN controller 104 and the client device 106(1) may use a password-mapped identifier to authenticate a client device with the WLAN controller 104. These techniques prevent a third party from authenticating with the WLAN controller 104 using a single, one-time password. Therefore, by employing password-mapped SAE, the WLAN controller 104 and the client device 106(1) reduce the number of security vulnerabilities present in conventional WPA3. Moreover, end user security is not comprised with respect to neighboring end users as each user has a different password mapping for a single service set identifier.

In another embodiment, these password-mapped identifier techniques may be employed in micro-segmentation. For example, Internet service providers may implement a switch-independent solution to block some peer-to-peer network traffic. A group of known client devices, such as client devices owned and/or operated by a family, may have a common or shared pre-shared key (PSK). For example, a first device may send data packets in peer-to-peer network traffic. The first device may append a tag to the data packets. For example, the tag may be the password-mapped identifier. A second device may receive the tagged peer-to-peer network traffic. The second device may determine whether to accept or drop the peer-to-peer network traffic by determining whether the password-mapped identifier of the second device matches the password-mapped identifier in the received peer-to-peer network traffic. Moreover, the peer-to-peer network traffic blocking may be applicable only for traffic within a LAN and not for traffic travelling between LANs. Therefore, the password-mapped identifier techniques may be used to block peer-to-peer network traffic as well.

In still another embodiment, the password-mapped identifier may also be mapped with a media access control (MAC) address of a client device. The mapping of password-mapped identifier and MAC address may also be stored at a WLAN controller. The WLAN controller may determine whether the password-mapped identifiers of the source and destination client devices are the same. If they are the same, then the WLAN controller may allow the network traffic. However, if they are different, then the WLAN controller may block the traffic. In other words, the WLAN controller may provide a private LAN function to the client devices.

Turning to FIG. 3, and with continuing reference to FIGS. 1 and 2, shown is a table depicting a mapping 300 of password-mapped identifiers and passwords, according to an example embodiment. For example, the WLAN controller 104 may store the mapping 300 in storage, such as a database. The mapping 300 may be stored in the form of a table, for example. The mapping 300 may include a plurality of passwords 302(1)-302(10) and a plurality of password-mapped identifiers 304(1)-304(10). For example, at least one of the passwords 302(1)-302(10) and corresponding password-mapped identifiers may be assigned to a user, such as an apartment tenant, to authenticate with the WLAN controller 104. As described above, when each user of a client device has its own password for authenticating with the WLAN controller 104, the WLAN controller 104 does not know which password to use to generate the scalar and element fields. However, because each of the passwords 302(1)-302(10) is mapped to a password-mapped identifier 304(1)-304(10), the client device 106 may provide to the WLAN controller 104 the password-mapped identifier to enable the WLAN controller 104 to use the password associated with the user when generating the scalar and element fields.

For example, a first tenant may be assigned PasswordB 302(2) with a password-mapped identifier 304(2) as two. A second tenant may be assigned PasswordG 302(7) with a password-mapped identifier 304(7) as seven. When the first tenant attempts to authenticate with the WLAN controller 104, the first tenant may attempt to authenticate using both the password 302(2) and the password-mapped identifier 304(2). A client device, such as client device 106(1), for the first tenant may provide only the password-mapped identifier 302(2) to the WLAN controller 104. Using a mapping, such as mapping 300, the WLAN controller 104 may then determine which password to use to authenticate the first tenant. Because the WLAN controller 104 receives the password-mapped identifier 304(2), the WLAN controller uses the password 302(2). Similarly, the second tenant's client device, such as client device 106(2), may transmit its password-mapped identifier 304(7) to the WLAN controller 104. The WLAN controller 104 may then use the password-mapped identifier 304(7) to determine the correct password 302(7) to use to authenticate the second tenant. Therefore, the WLAN controller 104 may authenticate multiple clients, each with their own unique password, without transmission of the password itself.

As another example, a tenant with a password and a password-mapped identifier may move out of the apartment complex. To prevent the tenant from improperly authenticating with the WLAN controller 104, the password and password-mapped identifier may be deactivated or invalidated. Therefore, when the tenant attempts to authenticate with the WLAN controller 104 after moving out, the WLAN controller 104 may use a different password or will not have a password associated with the received password-mapped identifier in the mapping 300. Therefore, the tenant will not be authenticated with the WLAN controller 104.

Figure 4:
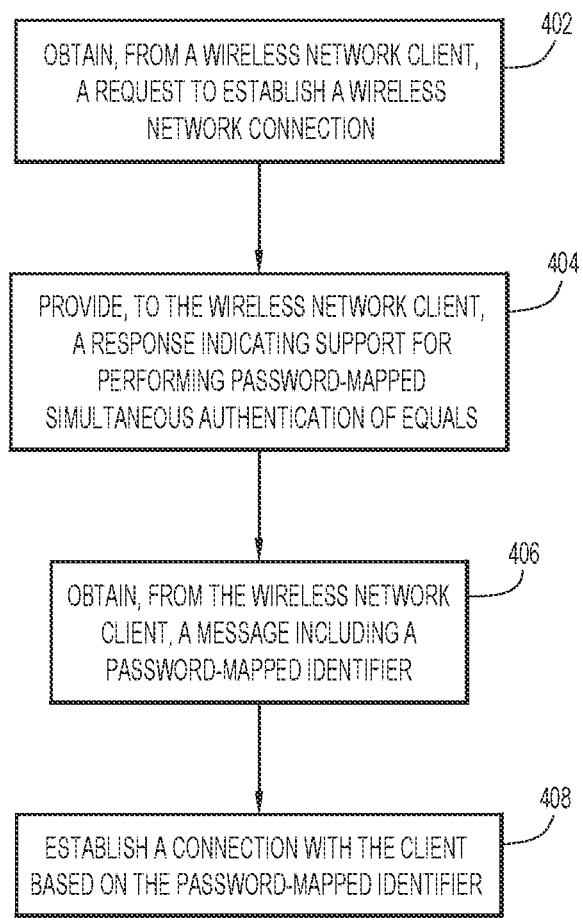
FIG. 4 is a flowchart depicting a method for employing a password-mapped identifier to authenticate a client device, according to an example embodiment.

Turning to FIG. 4, shown is a flowchart depicting a method 400 for employing a password-mapped identifier to authenticate a client device, according to an example embodiment. For example, the method 400 may be performed by the password mapped SAE controller logic 110 of a WLAN controller. At operation 402, a WLAN controller may obtain, from a client device, a request to establish a wireless network connection. For example, the client device may request to establish a connection with an access point that is controlled or configured by the WLAN controller or establish a connection with the WLAN controller. The request may be received at the WLAN controller directly from the client device or it may be received from the client device via the access point. Alternatively, the access point may perform the operations of the WLAN controller.

At operation 404, the WLAN controller may provide to the client device, in response to receiving the request at operation 402, a response. The response may include an indication that the WLAN controller is configured to perform password-mapped SAE. For example, the response may have a suite type of a value from a reserved pool of values. In one embodiment, the suite type may have a value of 30.

At operation 406, the WLAN controller may obtain, from the client device, a message. The message may include a password-mapped identifier. The password mapped identifier may be any value.

At operation 408, the WLAN controller may establish a connection with the client device based on the password-mapped identifier. For example, the WLAN controller may include a mapping of passwords to password-mapped identifiers. Such a mapping may be stored in, for example, a database. The WLAN controller may use the obtained password-mapped identifier to determine the password the client device is using to authenticate itself with the WLAN controller. The WLAN controller may then use this password to generate a password element, controller scalar and element values. The client device scalar and element values may have been obtained in the message including the password-mapped identifier. If the controller password element value is computed using the same password as the client generated its password element value, then the common shared secret shall be generated at both WLAN controller and client device. This will lead to the confirm message being verified by the controller as the controller computes same confirm as shared by the client in confirm message thus the client device has authenticated itself with the WLAN controller. However, if the password-mapped identifier indicates an incorrect password, then the password element will not match with the client device password element and thus the confirm element computation and shared secret computed at both the client device and WLAN controller will differ resulting in confirm message verification failure. Under these circumstances, the client device does not authenticate itself with the WLAN controller.

Figure 5:
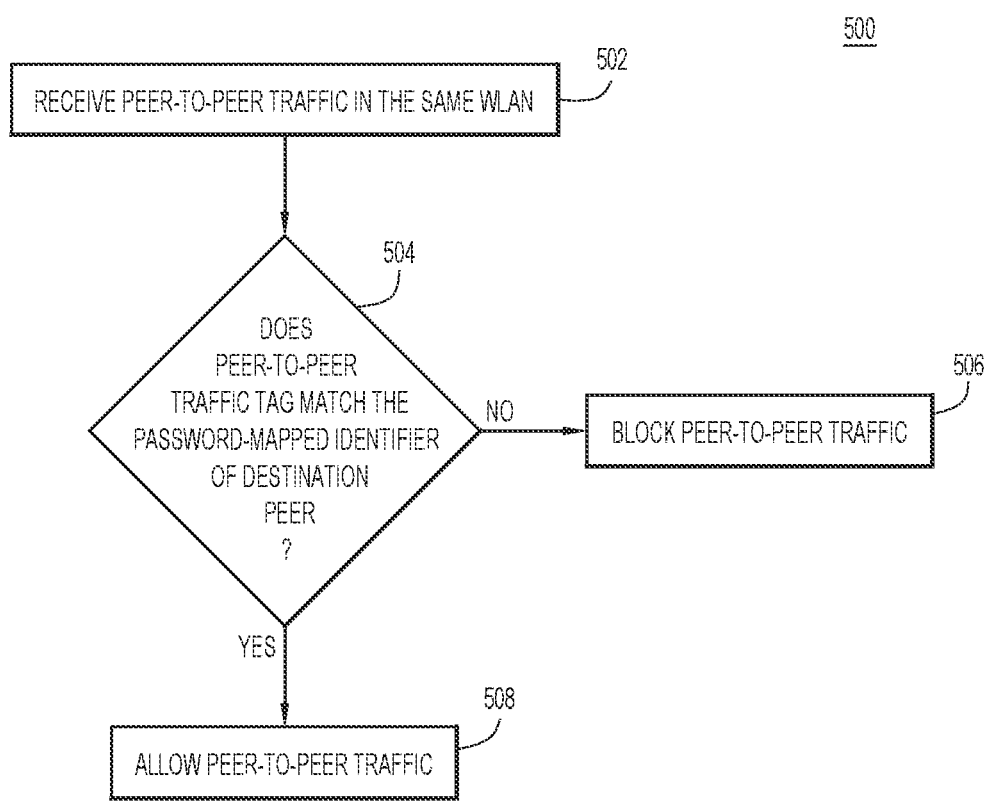
FIG. 5 is a flowchart depicting a method for blocking peer-to-peer traffic using a password-mapped identifier, according to an example embodiment.

Turning to FIG. 5, shown is a flowchart depicting a method 500 for blocking peer-to-peer traffic using a password-mapped identifier, according to an example embodiment. For example, the password-mapped SAE controller logic 110 of the WLAN controller 104 may perform the method 500. The WLAN controller also enables peer to peer traffic blocking in same WLAN if the password mapped identifier for source and destination are different based on password mapped identifier being sent in the traffic. Additionally the WLAN controller also uses the client MAC to password mapped identifier storage/mapping at its end to allow traffic between peers, stations, or clients having the same password mapped identifier thus providing private WLAN functionality based on password mapped identifier.

At operation 502, the WLAN controller may receive peer-to-peer traffic for transmission within the same WLAN. The peer-to-peer traffic may include a peer-to-peer tag. The peer-to-peer tag may be the password-mapped identifier, for example.

At operation 504, the password-mapped SAE controller logic may determine whether the peer-to-peer tag match the password-mapped identifier of a destination peer. If the peer-to-peer tag matches the password-mapped identifier of the destination peer, then the method proceeds to operation 508. However, if the peer-to-peer tag does not match the password-mapped identifier of the destination peer, then the method 500 proceeds to operation 506.

At operation 506, the password-mapped SAE controller logic may block the peer-to-peer traffic to continue to the destination peer.

At operation 508, the password-mapped SAE controller may allow the peer-to-peer traffic from reaching the destination peer.

Therefore, as depicted in FIG. 5, the password-mapped identifier may also be used in a peer-to-peer networking context to block peer-to-peer traffic when the tag of the peer-to-peer traffic does not match the password-mapped identifier of the destination peer.

Figure 6:
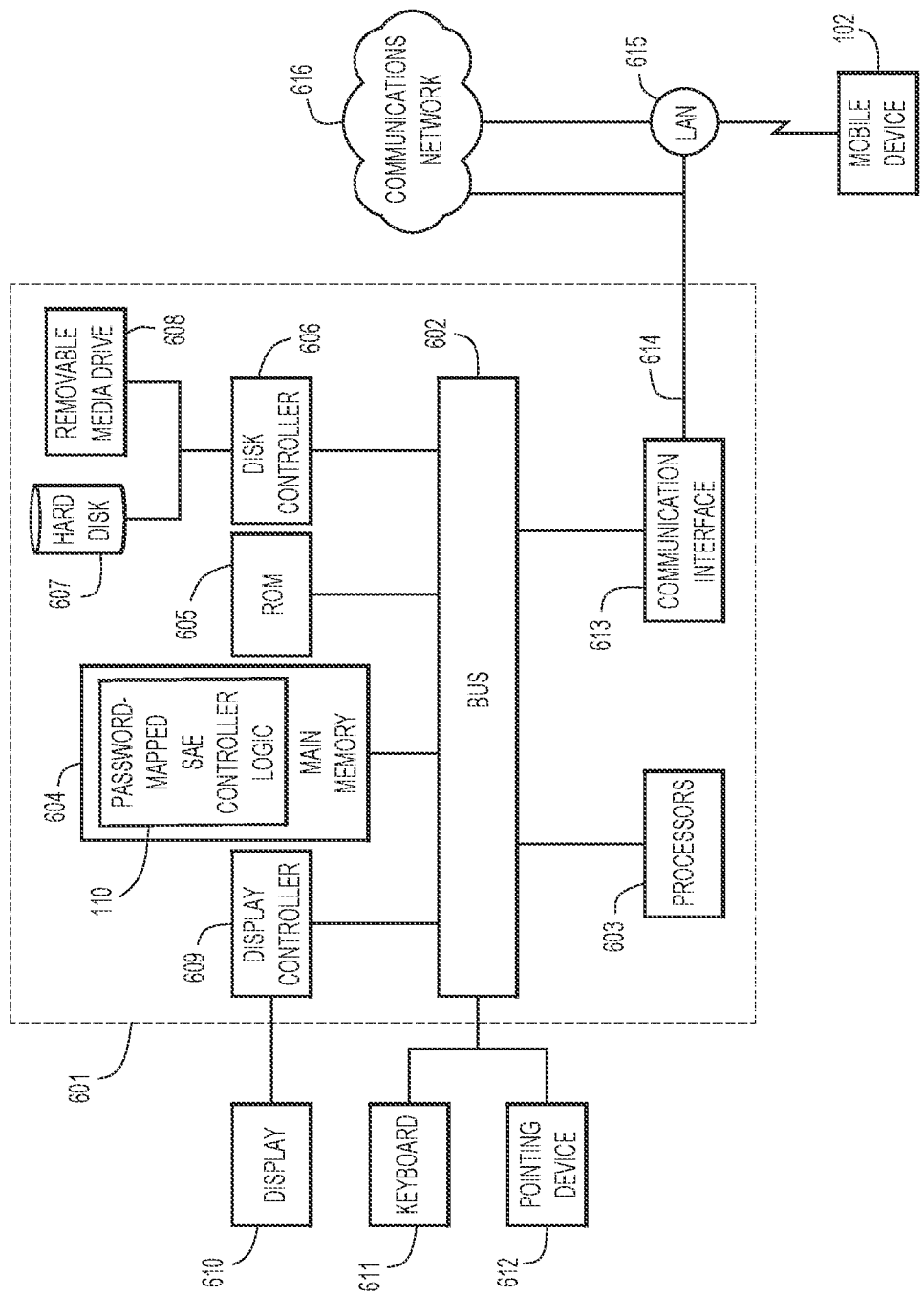
FIG. 6 is a block diagram showing a server configured to perform the network security techniques, according to an example embodiment.

FIG. 6 is a block diagram showing a server, e.g., WLAN controller 104 shown in FIG. 1, configured to perform the network security techniques, according to an example embodiment. FIG. 6 illustrates a computer system 601 upon which the embodiments presented may be implemented. The computer system 601 includes a bus 602 or other communication mechanism for communicating information, and a processor 603 coupled with the bus 602 for processing the information. While the figure shows a single block 603 for a processor, it should be understood that the processors 603 represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., read-only compact disc drive and read/write compact disc drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a flat panel display, for displaying information to a computer user. The computer system 601 includes input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610.

The computer system 601 performs a portion or all of the processing steps of the process in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, PROMs (EPROM, EEPROM, flash EPROM), DRAM, SRAM, SD RAM, or any other magnetic medium, compact discs (e.g., CD-ROM), or any other medium from which a computer can read.

Stored on any one or on a combination of non-transitory computer readable storage media, embodiments presented herein include software for controlling the computer system 601, for driving a device or devices for implementing the process, and for enabling the computer system 601 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The computer system 601 can transmit and receive data, including program code, through the network(s) 615 and 616, the network link 614 and the communication interface 613. Moreover, the network link 614 may provide a connection through a LAN 615 to an access point 102.

In summary, a wireless network controller obtains, from a wireless network client device, a request to establish a wireless network connection. In response, the wireless network controller provides, to the wireless network client device, a response indicating support for performing password-mapped simultaneous authentication of equals. The wireless network controller then obtains, from the wireless network client device, a message including a password-mapped identifier. Based on the password-mapped identifier, the wireless network controller establishes a connection with the wireless network client device.

In another embodiment, the wireless network controller also determines a password mapped to the password-mapped identifier. The wireless network controller then uses the password as an input into the simultaneous authentication of equals algorithm.

In another aspect, the mapping between the password-mapped identifier and the password is unique.

In yet another embodiment, the response provided by the wireless network controller includes an unreserved authentication key management (AKM) suite type to indicate support for performing password-mapped simultaneous authentication of equals.

In yet another aspect, the password-mapped identifier has a length of two octets.

In another embodiment, the method also includes receiving peer-to-peer network traffic from the wireless network client device destined for a second wireless network client device. The second wireless network client device has a password-mapped identifier. The method then determines whether a tag of the peer-to-peer network traffic matches the password-mapped identifier of the second wireless network client device. If the tag matches the password-mapped identifier of the second wireless network client device, then the peer-to-peer network traffic is forwarded to the second wireless network client device. However, if the tag does not match the password-mapped identifier of the second wireless network client device, then the peer-to-peer network traffic to the second wireless network client device is blocked.

In another aspect, the password-mapped identifier is also mapped to a media access control (MAC) address of the wireless network client device. The wireless network controller also blocks peer-to-peer network traffic destined for a second wireless network client device when the password-mapped identifier of the wireless network client device does not match the password-mapped identifier of the second wireless network client device.

In another embodiment, an apparatus that includes a communication interface configured to enable network communications and a processing device coupled with the communication interface is disclosed. The processing device is configured to obtain, from a wireless network client, a request to establish a wireless network connection. The processing device then provides to the wireless network client device, a response indicating support for performing password-mapped simultaneous authentication of equals. The processing device obtains, from the wireless network client device, a message including a password-mapped identifier. The processing device then establishes a connection with the wireless network client device based on the password-mapped identifier.

In yet another embodiment, a non-transitory computer readable storage media encoded with instructions is disclosed. The instructions, when executed by a processor, cause the processor to obtain, from a wireless network client, a request to establish a wireless network connection. The instructions further cause the processor to provide, to the wireless network client device, a response indicating support for performing password-mapped simultaneous authentication of equals. The processor then obtains, from the wireless network client device, a message including a password-mapped identifier. The instructions then cause the processor to establish a connection with the wireless network client device based on the password-mapped identifier.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method performed at a wireless network controller, comprising:
    storing mapping information in which a plurality of passwords are uniquely mapped to a plurality of corresponding password-mapped identifiers and respective media access control (MAC) addresses of respective wireless network client devices;
obtaining, from a wireless network client device, a request to establish a wireless network connection;
providing, to the wireless network client device, a response indicating that the wireless network controller supports performing password-mapped simultaneous authentication of equals;
obtaining, from the wireless network client device, a message including a password-mapped identifier;
determining a password mapped to the password-mapped identifier by performing a lookup operation in the mapping information, wherein the wireless network client device has a unique password mapping for a service set identifier;
using the password as an input into a simultaneous authentication of equals algorithm; and
establishing a connection with the wireless network client device based on the simultaneous authentication of equals algorithm.

2. The method of claim 1, wherein the response includes an unreserved authentication key management (AKM) suite type to indicate support for performing the password-mapped simultaneous authentication of equals.

3. The method of claim 1, wherein the password-mapped identifier has a length of two octets.

4. The method of claim 3, further comprising:
receiving peer-to-peer network traffic from the wireless network client device and destined for a second wireless network client device having another password-mapped identifier;
determining whether a tag of the peer-to-peer network traffic matches the another password-mapped identifier of the second wireless network client device;
when the tag matches the another password-mapped identifier of the second wireless network client device, forwarding the peer-to-peer network traffic to the second wireless network client device; and
when the tag does not match the another password-mapped identifier of the second wireless network client device, blocking the peer-to-peer network traffic to the second wireless network client device.

5. The method of claim 1, further comprising: blocking peer-to-peer network traffic destined for a second wireless network client device when the password-mapped identifier of the wireless network client device does not match the password-mapped identifier of the second wireless network client device.

6. The method of claim 1, further comprising:
providing a probe response including an unreserved authentication key management (AKM) suite type, wherein the AKM suite type indicates whether the wireless network controller or an access point supports (a) performing the simultaneous authentication of equals algorithm or (b) performing the password-mapped simultaneous authentication of equals, based on a value of the AKM suite type selected from a reserved pool of values.

7. The method of claim 1, further comprising:
obtaining, from a password-mapped identifier field in the message, the password-mapped identifier; and
obtaining, from the message, an encryption type, a client device scalar, and element values, wherein the element values are placed before the password-mapped identifier field.

8. An apparatus comprising:
a communication interface configured to enable network communications;
a processing device coupled with the communication interface, and configured to:
store, in a memory, mapping information in which a plurality of passwords are uniquely mapped to a plurality of corresponding password-mapped identifiers and to respective media access control (MAC) addresses of respective wireless network client devices;
obtain, from a wireless network client device, a request to establish a wireless network connection;
provide, to the wireless network client device, a response indicating that the apparatus supports performing password-mapped simultaneous authentication of equals;
obtain, from the wireless network client device, a message including a password-mapped identifier;
determine a password mapped to the password-mapped identifier by performing a lookup operation in the mapping information, wherein the wireless network client device has a unique password mapping for a service set identifier;
use the password as an input into a simultaneous authentication of equals algorithm; and
establish a connection with the wireless network client device based on the simultaneous authentication of equals algorithm.

9. The apparatus of claim 8, wherein the response includes an unreserved authentication key management (AKM) suite type to indicate support for performing the password-mapped simultaneous authentication of equals.

10. The apparatus of claim 8, wherein the password-mapped identifier has a length of two octets.

11. The apparatus of claim 10, wherein the processing device is further configured to:
receive peer-to-peer network traffic from the wireless network client device and destined for a second wireless network client device having another password-mapped identifier;
determine whether a tag of the peer-to-peer network traffic matches the another password-mapped identifier of the second wireless network client device;
when the tag matches the another password-mapped identifier of the second wireless network client device, forwarding the peer-to-peer network traffic to the second wireless network client device; and
when the tag does not match the another password-mapped identifier of the second wireless network client device, blocking the peer-to-peer network traffic to the second wireless network client device.

12. The apparatus of claim 8, wherein the processing device is further configured to:
block peer-to-peer network traffic destined for a second wireless network client device when the password-mapped identifier of the wireless network client device does not match the password-mapped identifier of the second wireless network client device.

13. The apparatus of claim 8, wherein the processing device is further configured to:
provide a probe response including an unreserved authentication key management (AKM) suite type, wherein the AKM suite type indicates whether the apparatus supports (a) performing the simultaneous authentication of equals algorithm or (b) performing the password-mapped simultaneous authentication of equals, based on a value of the AKM suite type selected from a reserved pool of values.

14. The apparatus of claim 8, wherein the processing device is further configured to:
   obtain, from a password-mapped identifier field in the message, the password-mapped identifier; and
   obtain, from the message, an encryption type, a client device scalar, and element values, wherein the element values are placed before the password-mapped identifier field.

15. One or more non-transitory computer readable storage media encoded with instructions that, when executed by a processor, cause the processor to:
   store mapping information in which a plurality of passwords are uniquely mapped to a plurality of corresponding password-mapped identifiers and respective media access control addresses of respective wireless network client devices;
   obtain, from a wireless network client device, a request to establish a wireless network connection;
   provide, to the wireless network client device, a response indicating that a wireless access controller or an access point supports performing password-mapped simultaneous authentication of equals;
   obtain, from the wireless network client device, a message including a password-mapped identifier;
   determine a password mapped to the password-mapped identifier by performing a lookup operation in the mapping information, wherein the wireless network client device has a unique password mapping for a service set identifier;
   use the password as an input into a simultaneous authentication of equals algorithm; and
   establish a connection with the wireless network client device based on the simultaneous authentication of equals algorithm.

16. The one or more non-transitory computer readable storage media of claim 12, wherein the instructions further cause the processor to:
   receive peer-to-peer network traffic from the wireless network client device and destined for a second wireless network client device having another password-mapped identifier;
   determine whether a tag of the peer-to-peer network traffic matches the another password-mapped identifier of the second wireless network client device;
   when the tag matches the another password-mapped identifier of the second wireless network client device, forwarding the peer-to-peer network traffic to the second wireless network client device; and
   when the tag does not match the another password-mapped identifier of the second wireless network client device, blocking the peer-to-peer network traffic to the second wireless network client device.

17. The one or more non-transitory computer readable storage media of claim 15, wherein the instructions further cause the processor to:
   block peer-to-peer network traffic destined for a second wireless network client device when the password-mapped identifier of the wireless network client device does nog match the password-mapped identifier of the second wireless network client device.

18. The one or more non-transitory computer readable storage media of claim 15, wherein the response includes an unreserved authentication key management (AKM) suite type to indicate support for performing the password-mapped simultaneous authentication of equals.

19. The one or more non-transitory computer readable storage media of claim 15, wherein the instructions further cause the processor to:
   provide a probe response including an unreserved authentication key management (AKM) suite type, wherein the AKM suite type indicates whether the wireless access controller or the access point supports (a) performing the simultaneous authentication of equals algorithm or (b) performing the password-mapped simultaneous authentication of equals, based on a value of the AKM suite type selected from a reserved pool of values.

20. The one or more non-transitory computer readable storage media of claim 15, wherein the instructions further cause the processor to:
   obtain, from a password-mapped identifier field in the message, the password-mapped identifier; and
   obtain, from the message, an encryption type, a client device scalar, and element values, wherein the element values are placed before the password-mapped identifier field.

* * * * *